(12) United States Patent
You et al.

(10) Patent No.: US 8,199,088 B2
(45) Date of Patent: Jun. 12, 2012

(54) ARRAY SUBSTRATE, METHOD OF MANUFACTURING THE ARRAY SUBSTRATE, AND LIQUID CRYSTAL DISPLAY DEVICE HAVING THE ARRAY SUBSTRATE

(75) Inventors: Hye-Ran You, Incheon (KR); Yoon-Sung Um, Yongin-si (KR); Su-Jeong Kim, Seoul (KR); Jae-Jin Lyu, Yongin-si (KR); Seung-Beom Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 459 days.

(21) Appl. No.: 12/413,149

(22) Filed: Mar. 27, 2009

(65) Prior Publication Data

US 2010/0019998 A1    Jan. 28, 2010

(30) Foreign Application Priority Data

Jul. 28, 2008   (KR) .......................... 10-2008-073647

(51) Int. Cl.
*G09G 3/36* (2006.01)
(52) U.S. Cl. ......................................... 345/87; 349/141
(58) Field of Classification Search ............ 345/87–102; 349/43, 139, 141, 170, 175, 173
See application file for complete search history.

(56) References Cited

U.S. PATENT DOCUMENTS

| | | | | |
|---|---|---|---|---|
| 7,405,427 B2* | 7/2008 | Lee et al. | .......................... | 257/59 |
| 7,567,325 B2* | 7/2009 | Ono et al. | ...................... | 349/139 |
| 7,623,194 B2* | 11/2009 | Lin | ................................. | 349/44 |
| 7,995,017 B2* | 8/2011 | Kim | ................................ | 345/88 |
| 8,009,256 B2* | 8/2011 | Yun et al. | ....................... | 349/139 |
| 2004/0004690 A1 | 1/2004 | Yamaguchi | | |
| 2004/0100607 A1 | 5/2004 | Kawata | | |
| 2006/0061722 A1* | 3/2006 | Jun | ................................ | 349/139 |
| 2007/0103607 A1 | 5/2007 | Hanaoka | | |
| 2007/0252936 A1* | 11/2007 | Ono et al. | ..................... | 349/139 |
| 2007/0285607 A1 | 12/2007 | Kim et al. | | |
| 2008/0273135 A1* | 11/2008 | Ono et al. | ....................... | 349/48 |
| 2011/0170027 A1* | 7/2011 | Nakanishi et al. | .............. | 349/33 |

FOREIGN PATENT DOCUMENTS

| | | |
|---|---|---|
| EP | 1058310 | 12/2000 |
| KR | 1020070070911 | 7/2007 |
| KR | 1020070091080 | 9/2007 |

OTHER PUBLICATIONS

European Office Action / Examination Report for European Patent Application 09004620.2 on Apr. 26, 2011.
European Search Report dated Aug. 10, 2009.

* cited by examiner

*Primary Examiner* — Nitin Patel
(74) *Attorney, Agent, or Firm* — H.C. Park & Associates, PLC

(57) ABSTRACT

In an array substrate, a method of manufacturing the array substrate, and a liquid crystal display (LCD) device having the array substrate, a pixel electrode includes an outline portion, connection portions, and slit portions. The outline portion is arranged toward a data line and a gate line thereon, and the connection portions extend in a direction that crosses the data line and the gate line, respectively, to connect to the outline portion. The slit portions protrude from side surfaces of the connection portions to connect to the outline portion. A shielding electrode is arranged toward the outline portion between the data line and the outline portion, and the gate line and the outline portion.

25 Claims, 16 Drawing Sheets
(3 of 16 Drawing Sheet(s) Filed in Color)

ARRAY SUBSTRATE, METHOD OF MANUFACTURING THE ARRAY SUBSTRATE, AND LIQUID CRYSTAL DISPLAY DEVICE HAVING THE ARRAY SUBSTRATE

CROSS REFERENCE TO RELATED APPLICATION

This application claims priority from and the benefit of Korean Patent Application No. 2008-73647, filed on Jul. 28, 2008, which is hereby incorporated by reference for all purposes as if fully set forth herein.

BACKGROUND OF THE INVENTION

1. Field of the Invention

The present invention relates to an array substrate, a method of manufacturing the array substrate, and a liquid crystal display (LCD) device having the array substrate. More particularly, exemplary embodiments of the present invention relate to array substrate having an improved display quality, a method of manufacturing the array substrate, and an LCD device having the array substrate.

2. Discussion of the Background

An LCD device of a mobile patterned vertical alignment (mPVA) mode (hereinafter, an mPVA LCD device) may have an optical mode, in which circular polarization is applied, and in which the transmissivity is relatively superior to other modes.

The mPVA LCD device having the circular polarization optical mode may have disadvantages related to viewing properties or contrast ratio compared to a PVA mode in which to linear polarization is applied. However, the transmissivity of the linear polarization PVA mode may be lower than the transmissivity of the circular polarization PVA mode.

Thus, when a linear polarization optical mode is applicable to an mPVA mode, the aperture ratio of a pixel may be large, and a liquid crystal director may form an angle of about 45 degrees with respect to the polarization axis of a polarizer, in order to improve transmissivity.

However, the linear polarization mPVA mode liquid crystal is controlled by a fringe field when a slit portion is formed on a common electrode of a color filter substrate. Accordingly, the linear polarization mPVA mode is disadvantageous in that transmissivity may be reduced.

To overcome these problems, a micro-slit mode, in which a slit is formed on a pixel electrode of an array substrate, rather than on the common electrode, may be used. However, the micro-slit mode is disadvantageous in that controlling the liquid crystal at edges of micro-slits or between the micro-slits formed on the pixel electrode is difficult, and the LCD device display quality may be deteriorated thereby.

SUMMARY OF THE INVENTION

The present invention provides an array substrate having an improved display quality.

The present invention also provides a method of manufacturing the above-mentioned array substrate.

The present invention also provides a liquid crystal display (LCD) device having the above-mentioned array substrate.

Additional features of the invention will be set forth in the description which follows, and in part will be apparent from the description, or may be learned by practice of the invention.

The present invention discloses an array substrate including a substrate, a pixel electrode, and a shielding electrode. The substrate includes a gate line and a data line that cross each other and that are insulated from each other, and a switching element connected to the gate line and the data line arranged thereon. The pixel electrode includes an outline portion, a plurality of connection portions, and a plurality of slit portions. The outline portion is arranged on the substrate along the data line and the gate line. The connection portions extend in a crossing direction of the data line and a crossing direction of the gate line, and connect to the outline portion. The connection portions divide a pixel area defined by the outline portion into a plurality of domains. The slit portions protrude from side surfaces of the connection portions in each of the domains, and the slit portions connect to the outline portion. The shielding electrode is arranged along the outline portions on the data line and the outline portions on the gate line to shield the data line and the gate line, respectively. The shielding electrode is arranged between the data line and the outline portion.

The present invention discloses a method of manufacturing an array substrate including forming a switching element, a pixel electrode, and a shielding electrode on a substrate. The switching element is connected to a gate line and a data line. The pixel electrode includes an outline portion formed on the substrate along the data line and the gate line, a plurality of connection portions dividing a pixel area, which are defined by the outline portion, into a plurality of domains. The pixel area extends in a crossing direction of the data line and a crossing direction of the gate line and connects to the outline portion, the connection portions, and a plurality of slit portions that protrude from side surfaces of the connection portions in each of the domains, in which the slit portions are connected to the outline portion. A shielding electrode is formed along the outline portion on the data line and the outline portion on the gate line to shield the data line and the gate line, respectively, and is disposed between the data line and the outline portion.

The present invention discloses an LCD device including a first substrate, a second substrate, and a liquid crystal layer. The first substrate includes an upper substrate and a common electrode. The second substrate includes a lower substrate, a pixel electrode, and a shielding electrode. The lower substrate has a switching element connected to a gate line, and a data line arranged thereon. The pixel electrode includes an outline portion, connection portions, and slit portions. The outline portion is arranged along the data line and the gate line thereon. The connection portions extend in a direction that crosses the data line and the gate line, respectively, to connect to the outline portion. The slit portions protrude from side surfaces of the connection portions to connect to the outline portion. The shielding electrode is arranged along the outline portion on the data line and the outline portion on the gate line to shield the data line and the gate line, respectively, and is arranged between the data line and the outline portion. The liquid crystal layer is disposed between the pixel electrode and the common electrode.

It is to be understood that both the foregoing general description and the following detailed description are exemplary and explanatory and are intended to provide further explanation of the invention as claimed.

BRIEF DESCRIPTION OF THE DRAWINGS

The patent or application file contains at least one drawing executed in color. Copies of this patent or patent application publication with color drawing(s) will be Provided by the Office upon request and payment of the necessary fee.

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
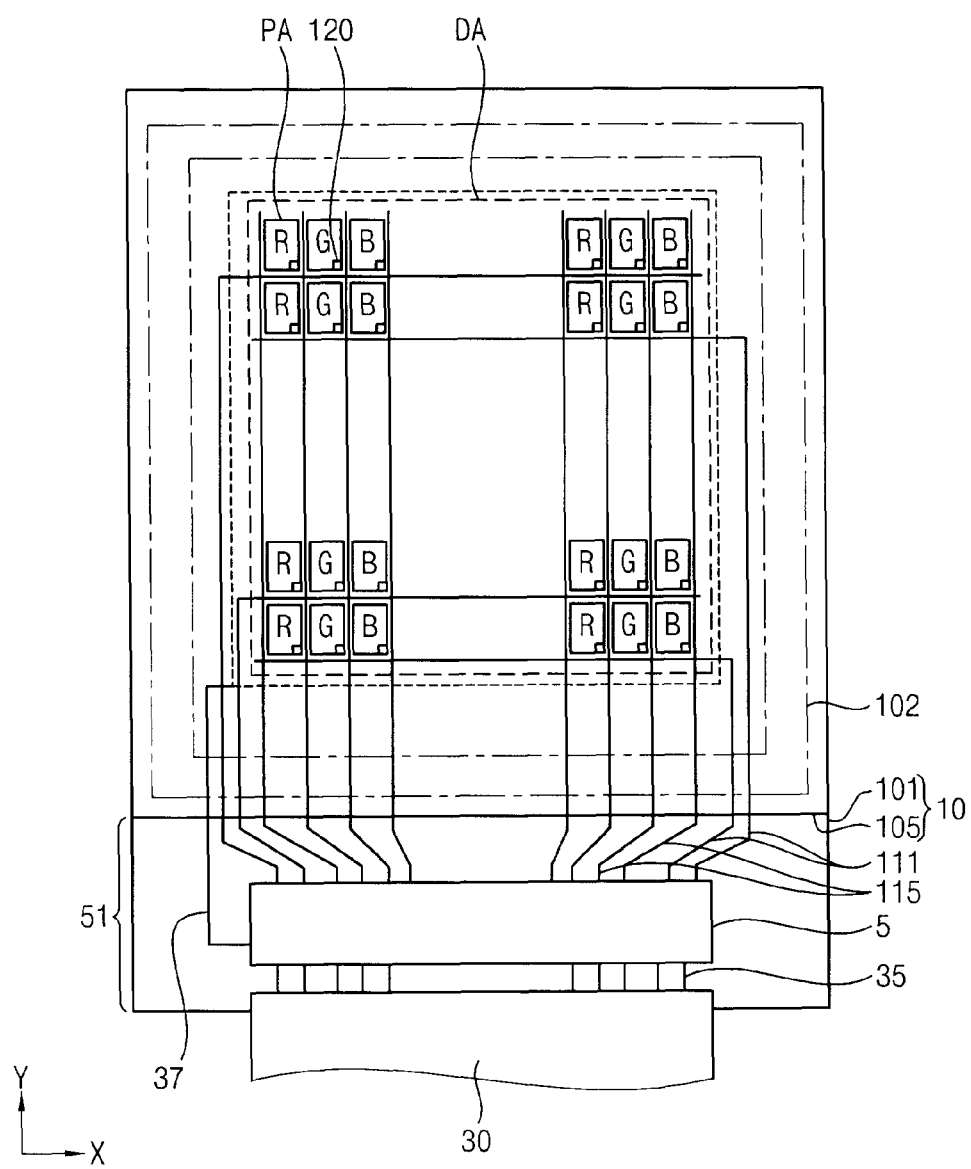
FIG. 1 is a plan view showing a liquid crystal display (LCD) device according to an exemplary embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as shown in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions shown herein but are to include deviations in shapes that result, for example, from manufacturing. For example, an implanted region shown as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions shown in the figures are schematic in nature and their shapes are not intended to show the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a plan view showing a liquid crystal display (LCD) device 100 according to an exemplary embodiment of the present invention.

Referring to FIG. 1, the LCD device 100 according to an exemplary embodiment of the present invention includes a display panel 10 and a driving part 5.

The display panel 10 includes an array substrate 101, an opposite substrate 105, and a liquid crystal layer. The array substrate 101 and the opposite substrate 105 opposite to each other are joined by a sealing member 102 having a frame shape. Liquid crystals are disposed in the space between the array substrate 101, the opposite substrate 105, and the sealing member 102 to form the liquid crystal layer.

The opposite substrate 105 is disposed in a direction from the ground, and the array substrate 101 is disposed in a direction toward the ground in FIG. 1.

The opposite substrate 105 may be a color filter substrate having an RGB color filter. The array substrate 101 is an element substrate being driven through an active matrix driving process using a thin-film transistor (TFT) element.

In addition, the array substrate 101 includes a pixel electrode having a micro-slit pattern formed therethrough in the LCD device 100, and the opposite substrate 105 includes a common electrode having a plate shape formed therethrough.

The array substrate 101 may have a substantially rectangular shape. In this embodiment, a horizontal direction of the array substrate 101 is defined as 'x', and a vertical direction of the array substrate 101 is defined as 'y'.

Figure 2:
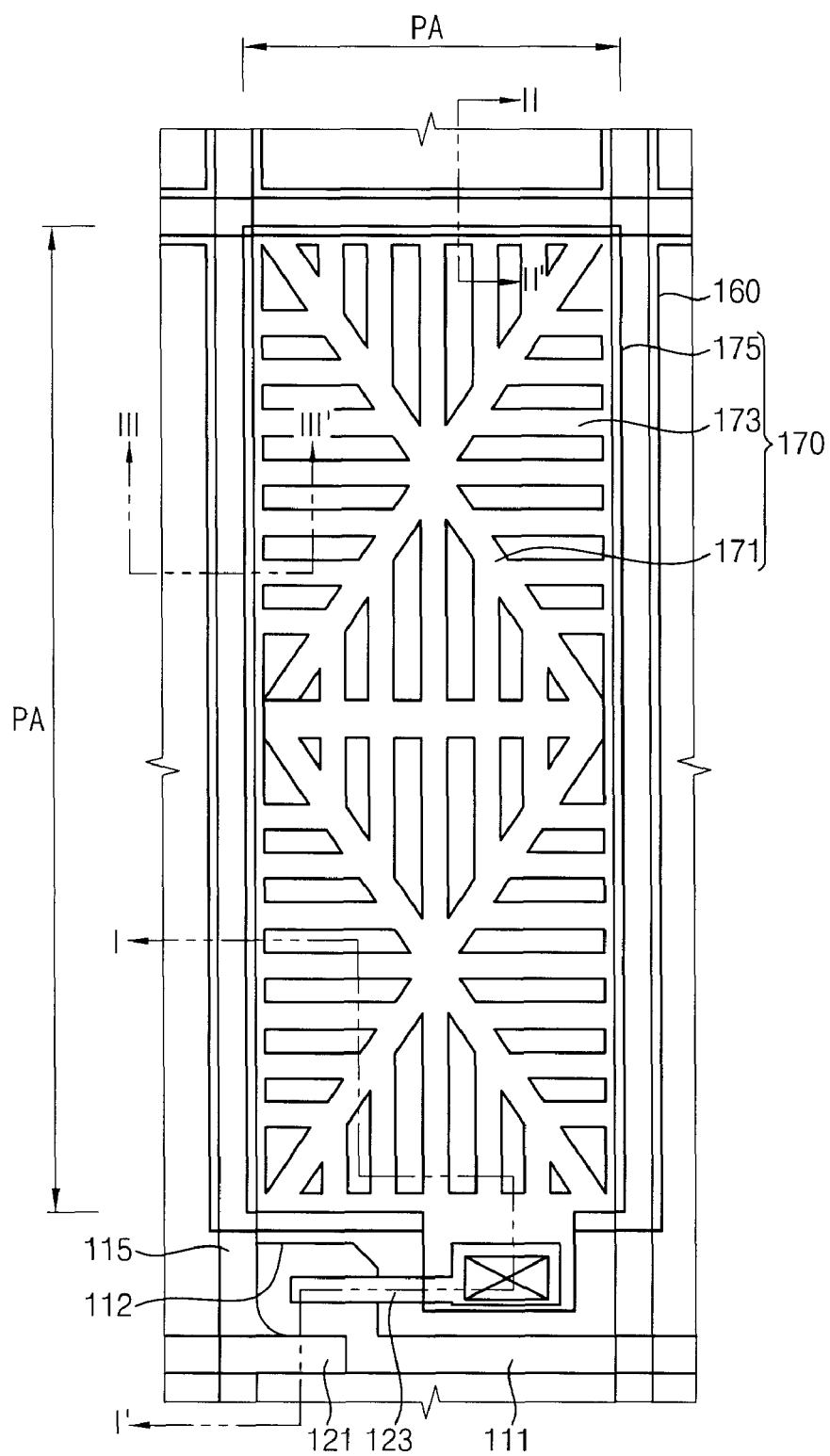
FIG. 2 is an enlarged plan view showing an example of a pixel area shown as FIG. 1.
Figure 3:
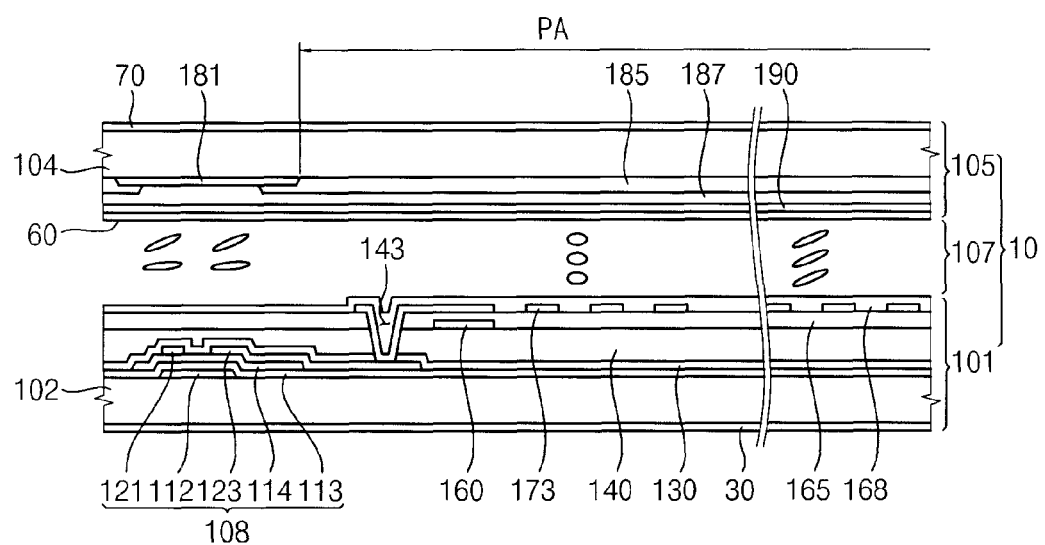
FIG. 3 is a cross-sectional view taken along line I-I' in FIG. 2.

FIG. 2 is an enlarged plan view showing an example of a pixel area shown as FIG. 1. FIG. 3 is a cross-sectional view taken along line I-I' in FIG. 2.

Referring to FIG. 1, FIG. 2, FIG. 3, a display device 100 includes an array substrate 101, an opposite substrate 105, and a liquid crystal layer 107.

A plan view of the array substrate 101 is shown in FIG. 2, and a cross-sectional view of the array substrate 101, the opposite substrate 105, and the liquid crystal layer 107 is shown in FIG. 3.

Referring to FIG. 1, FIG. 2, and FIG. 3, the array substrate 101 according to the present invention includes a lower substrate 102, a plurality of gate lines 111, a plurality of data lines 115, a switching element 108, a shielding electrode 160, and a pixel electrode 170.

FIG. 4A, FIG. 4B, FIG. 4C, FIG. 4D, FIG. 4E, FIG. 4F, FIG. 4G, FIG. 4H, and FIG. 4I are cross-sectional views showing a process for manufacturing the array substrate 101 as shown in FIG. 1, FIG. 2, and FIG. 3.

Figure 4A:
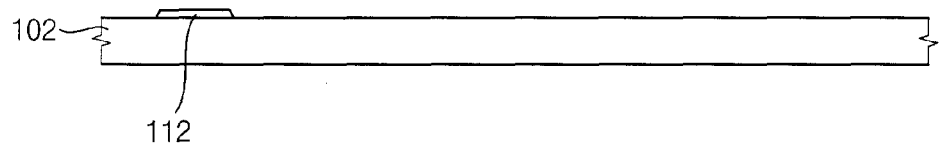
FIG. 4A, FIG. 4B, FIG. 4C, FIG. 4D, FIG. 4E, FIG. 4F, FIG. 4G, FIG. 4H, and FIG. 4I are cross-sectional views showing a process for manufacturing the array substrate shown in FIG. 1, FIG. 2, and FIG. 3.

According to a process for manufacturing an array substrate in this exemplary embodiment, a gate metal, which may be a two-layer structure formed of aluminum (Al) and molybdenum (Mo), is deposited to a thickness of about 3,000 Å via a sputtering process on the lower substrate 102, an etching process is performed as shown in FIG. 4A to form the gate lines 111 and the gate electrode 112 protruded from the gate line 111. The gate lines 111 are parallel with the horizontal direction to be extended on the lower substrate 102.

Figure 4B:
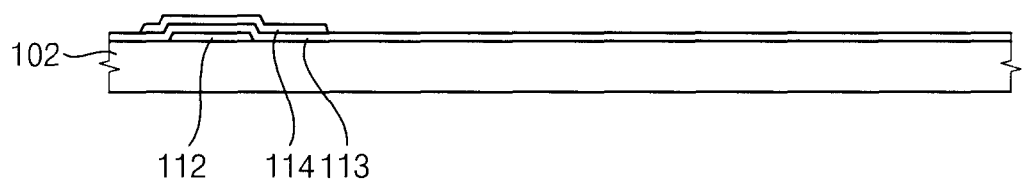

Then, a gate insulation layer 113 and a semiconductor pattern 114 are formed as shown in FIG. 3 and FIG. 4B. The gate insulation layer 113, which may be formed of silicon nitride (SiNx), is deposited to have a thickness of about 4,500 Å on the gate lines 111. A semiconductor layer, which may be made of amorphous silicon (n+ a-Si), is deposited to a thickness of about 2,000 Å on the gate insulation layer 113, and an amorphous silicon (n+ a-Si) layer doped at a high concentration is deposited to a thickness of about 500 Å on the gate insulation layer 113. The amorphous silicon (n+ a-Si) layers are etched to form a semiconductor pattern 114. The semiconductor pattern 114 is formed on the gate insulation layer 113 on a location corresponding to the gate electrode 112.

Figure 4C:
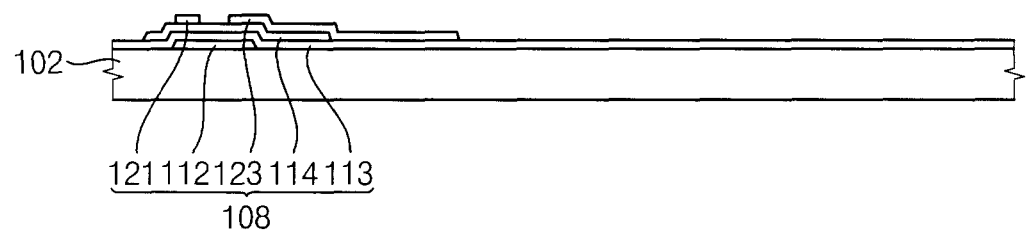

As shown in FIG. 3 and FIG. 4C, a data metal, which may be a three-layer structure formed of molybdenum-aluminum-molybdenum, is deposited to a thickness of about 300 Å, 2,500 Å, and 1,000 Å, respectively, on the gate insulation layer 113, and is patterned to form the data line 115, the source electrode 121, and the drain electrode 123.

The data lines 115 extend in the vertical direction 'y' on the gate insulation layer 113. The source electrode 121 protrudes from the data line 115 near the point where the gate line 111 crosses the data line 115, to extend on the semiconductor pattern 114 on the gate electrode 112. The drain electrode 123 is disposed on the semiconductor pattern 114 opposite to the source electrode 121, and extends on the gate insulation layer 113 in a portion of a pixel area PA.

In this exemplary embodiment, the pixel area PA has a substantially rectangular shape that extends in the vertical direction. Alternatively, the pixel area PA may have a Z-shape, such that the gate line 111 is arranged in the horizontal direction around the pixel area PA, and the data line 115 is arranged in the vertical direction around the pixel area PA.

When the semiconductor layer and the data metal layer are etched by a single etching process, the semiconductor pattern 114 is formed below the data line 115, the source electrode 121, and the drain electrode 123, and is formed on the gate line 112 on the gate insulation layer 113. A channel region, which is disposed between the source electrode 121 and the drain electrode 123, is formed semiconductor pattern 114 using an etch-back process.

The gate electrode 112, the gate insulation layer 113, the semiconductor pattern 114, the source electrode 121, and the drain electrode 123 compose a switching element 108.

Figure 4D:
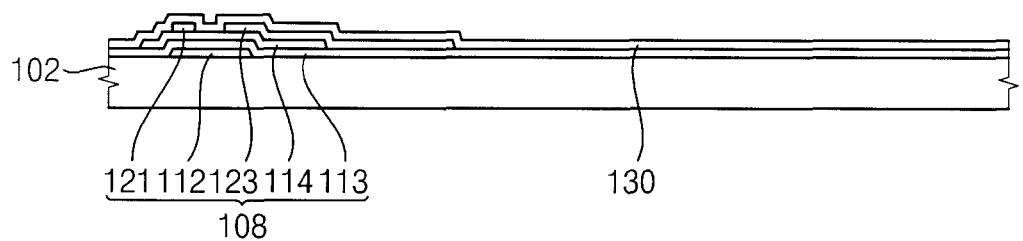

Then, as shown in FIG. 4D, a first passivation layer 130 covering the lower substrate 102 having the data line 115 formed thereon is formed. The first passivation layer 130, which may be made of silicon nitride (SiNx), may be deposited to a thickness of about 2,000 Å. A contact hole may be formed in the first passivation layer 130 to expose a portion of the drain electrode 123.

Figure 4E:
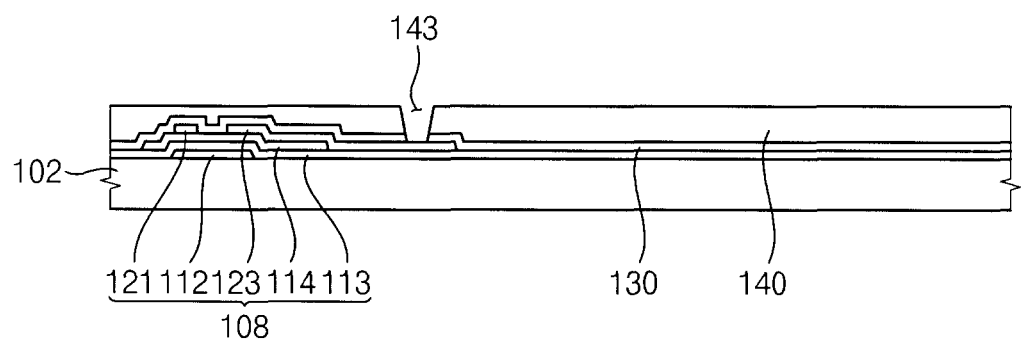

As shown in FIG. 4E, an organic insulation layer 140 is formed to a thickness of about 2.0 μm on the first passivation layer 130. A contact hole 143 exposing a portion of the drain electrode 123 may be formed in the organic insulation layer 140 and the first passivation layer 130. The organic insulation layer 140 reduces a parasitic capacitance between a pixel electrode 170, which will be described below, and the data line 115. When the pixel electrode 170 is formed to not overlap with the data line 115, the organic insulation layer 140 may be omitted.

Figure 4F:
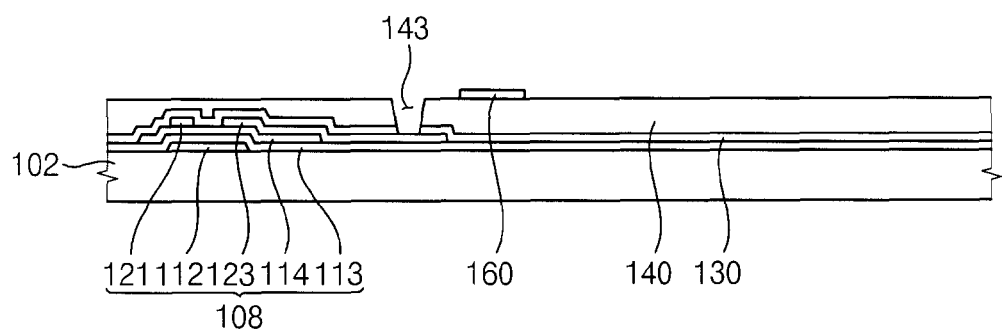

As shown in FIG. 4F, the shielding electrode 160 is formed on the organic insulation layer 140. The shielding electrode 160 may prevent a parasitic capacitance from forming between the data line 115, the gate line 111, and the pixel electrode 170. Alternatively, the shielding electrode 160 may form a storage capacitor with the pixel electrode 170 to store a pixel voltage applied to the pixel electrode 170 for one frame.

An optically transparent and electrically conductive material such as indium tin oxide (ITO) or indium zinc oxide (IZO) is deposited to a thickness of about 900 Å on the organic insulation layer 140, and is patterned to form the shielding electrode 160.

Figure 5A:
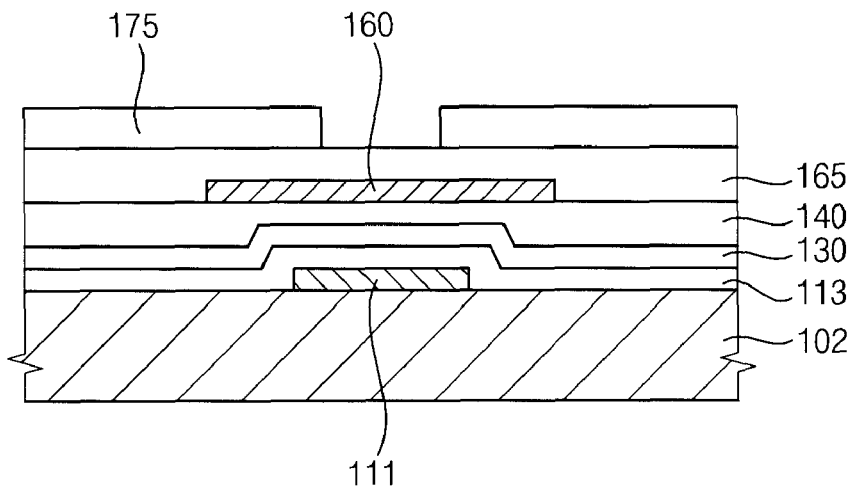
FIG. 5A is a cross-sectional view taken along line II-II' in FIG. 2.
Figure 5B:
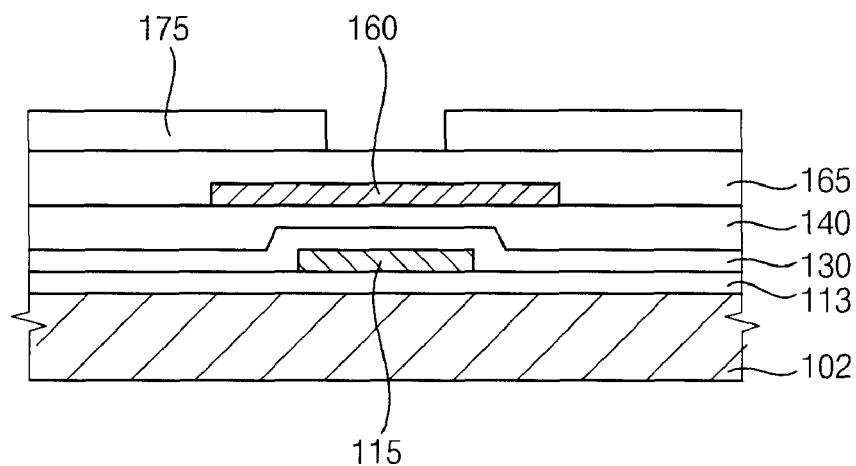
FIG. 5B is a cross-sectional view taken along line III-III' in FIG. 2.

FIG. 5A is a cross-sectional view taken along line II-II' in FIG. 2. FIG. 5B is a cross-sectional view taken along line II-II' in FIG. 2.

Referring to FIG. 2, FIG. 5A, and FIG. 5B, the shielding electrode 160 is formed on the gate line 111 and the data line 115 to shield in the width direction. That is, the shielding electrode 160 is formed on the gate line 111 between the pixel areas PA and the data line 115, and a line width of the shielding electrode 160 is wider than that of the gate line 111 and the data line 115, respectively. Thus, the shielding electrode 160 extends to an edge of the pixel area PA. In this exemplary embodiment, the shielding electrode 160 is formed from the optically transparent and electrically conductive material so that an aperture ratio of the pixel area PA is not reduced even if the shielding electrode 160 overlaps with an edge of the pixel area PA.

Figure 4G:
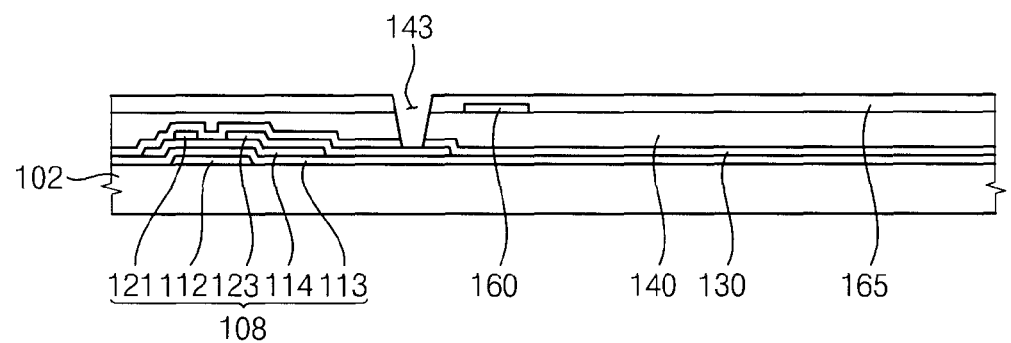

As shown in FIG. 4G, a second passivation layer 165 is formed on the shielding electrode 160. The second passivation 165 layer may be formed of a material and a thickness substantially identical to the first passivation layer 130. A contact hole may be formed in the second passivation layer 165, in which the contact hole is connected to a contact hole 143 formed in the organic insulation layer 140.

Figure 4H:
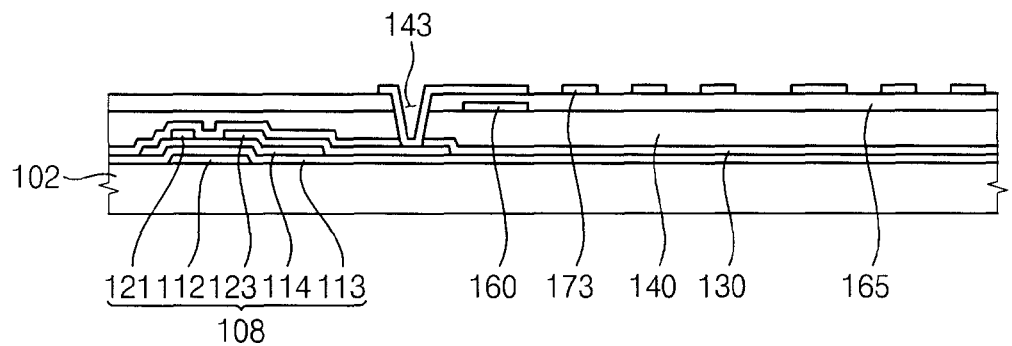

As shown in FIG. 4H, an optically transparent and electrically conductive material such as ITO or IZO is deposited to a thickness of about 900 Å on the second passivation layer 165, and is patterned to form the pixel electrode 170. The pixel electrode 170 is connected to the drain electrode 123 through the contact hole 143.

Referring to FIG. 2, FIG. 5A, and FIG. 5B, the pixel electrode 170 includes an outline portion 175, a connection portion 171, and a slit portion 173. The outline portion 175 is formed on the second passivation layer 165 and corresponds to the edge of the pixel area PA along the gate line 111 and the data line 115. A portion of the outline portion 175 may be formed to overlap with the shielding electrode 160 that extends to the edge of the pixel area PA in the width direction. As shown in FIG. 5A and FIG. 5B, a portion of the outline portion 175 may be formed to overlap with the gate line 111 and the data line 115 in the width direction.

The connection portions 171 divide the pixel area PA into a plurality of domains to connect to the outline portion 175. The connection portions 171 are disposed in a direction crossing an extending direction of the gate line 111 and the data line 115, respectively.

In this exemplary embodiment, as shown in FIG. 2, the pixel electrode 170 includes two of the connection portions 171. One connection portion 171 is disposed in a direction at an angle of 45 degrees with respect to the gate line 111, and another connection portion 171 is disposed in a direction at an angle of 135 degrees with respect to the gate line 111.

Two of the connection portions 171 extend to diagonal directions of the pixel electrode 170, respectively. Thus, the connection portions 171 are disposed in an X-shape. Accordingly, the pixel area PA is divided into eight domains by the connection portions 171.

The slit portions 173 are parallel with each other on the pixel area PA domains, respectively. The slit portions 173 protrude from side surfaces of the connection portion 171 to connect to the outline portion 175. The slit portions 173 are substantially parallel with the data line 115 on a domain contacting the gate line 111, and the slit portions 173 are substantially parallel with the gate line 111 on a domain contacting the data line 115.

In this exemplary embodiment, two pixel electrodes 170 are disposed on one pixel area PA. Two pixel electrodes 170 are disposed on the data line 115 to connect to each other through the outline portion 175. Thus, the length of the horizontal direction and the length of the vertical direction of the pixel electrode 170 are almost identical to each other. Accordingly, the length of the horizontal direction and the length of the vertical direction of the slit portions 173 are almost identical to each other.

When a data signal is applied from the driving part 5 to the data line 115, and a gate signal is applied to the gate line 111, the data signal is applied to the pixel electrode 170 via the switching element 108 as a pixel voltage.

In this exemplary embodiment, a portion of the outline portion 175 of the pixel electrode 170 overlaps with the data line 115 and the gate 111, but the shielding electrode 160 forms a parasitic capacitance with the data line 115 and prevents a parasitic capacitance from being formed between the pixel electrode 170 and the data line 115, thus preventing a distorted data signal.

Figure 4I:
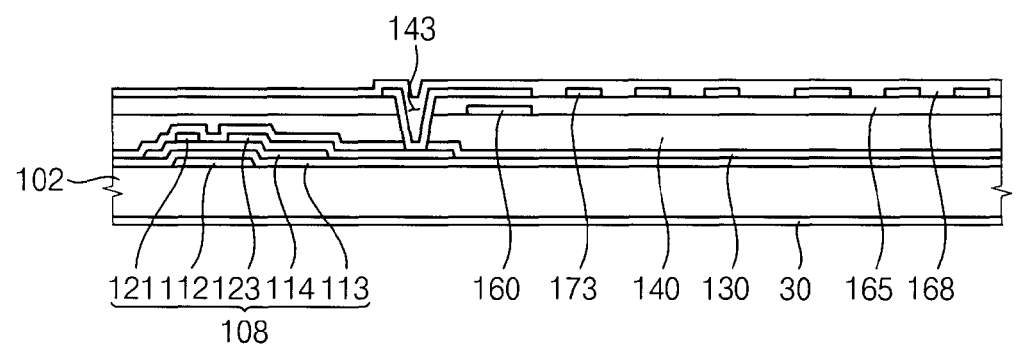

Finally, as shown in FIG. 4I, a lower alignment layer 168 covering the pixel electrode 170 is formed.

The lower alignment layer 168 and the opposite substrate 105, which will be described below, make liquid crystal molecules of the liquid crystal layer 107 align in a perpendicular direction. That is, the liquid crystal molecules are aligned in the direction from the array substrate 101 toward the opposite substrate 105 in a first stage.

The array substrate may further include a lower polarizer 30. As shown in FIG. 4I, the lower polarizer 30 is attached on the lower substrate 102 to be manufactured in the array substrate 101.

The lower polarization axis of the lower polarizer 30 is parallel with extending directions of the connection portions 171, that is, diagonal directions. Accordingly, the lower polarization axis is disposed in a direction at an angle of about 45 degrees or about 135 degrees with respect to the extending direction of the slit portion 173.

Referring to FIG. 1, FIG. 2, and FIG. 3, the opposite substrate 105 may include an upper substrate 104, a light-blocking pattern 181, a color filter pattern 185, an overcoating layer 187, a common electrode 190, an upper alignment layer 60, and an upper polarizer 70.

The light-blocking pattern 181 is formed below the upper substrate 104 in correspondence with the gate line 111, the data line 115, and the switching element 108. Thus, a color filter pattern 185 is formed on the upper substrate corresponding to the pixel area PA. A color filter pattern 185 may include, for example, a red filter, a green filter, and a blue filter. The red filter, the green filter, and the blue filter may be disposed in order on each pixel area PA in the horizontal direction x.

The overcoating layer 187 covers the color pattern 185 and the light-blocking pattern 181, and the common electrode 190 is formed on the overcoating layer 187.

The upper alignment layer 60 is formed on the common electrode 190 to vertically align a liquid crystal layer 107.

The upper polarizer 70 is attached on the upper substrate 104, and a polarization axis of the upper polarizer 70 may be substantially perpendicular to a polarization axis of the lower polarizer 30.

In this exemplary embodiment, where micro-slit patterns such as the slit portions 173 are formed in the pixel electrode 170, a vertically aligned liquid crystal is used. Thus, a plurality of domains may be formed in the pixel area PA so that side viewing properties of the LCD device 100 may be improved.

Figure 6:
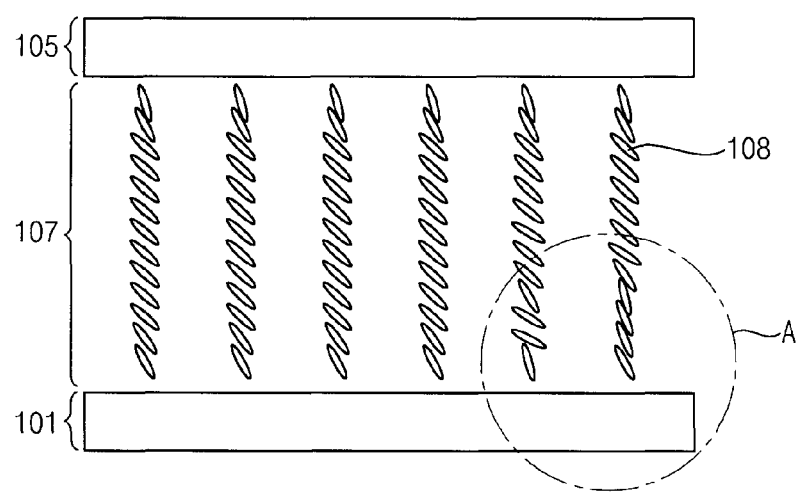
FIG. 6 is a cross-sectional view showing movements of a liquid crystal layer between the shielding electrode and the outline portion of a pixel electrode in FIG. 5A and FIG. 5B.

FIG. 6 is a cross-sectional view showing movements of liquid crystal layer between the shielding electrode and the outline portion of a pixel electrode in FIG. 5A or FIG. 5B.

Referring to FIG. 6, when the pixel voltage is applied to the pixel electrode 170, an electric field boundary is formed between the shielding electrode 160 and the outline portion 175. An edge of the outline portion 175 overlaps with an upper portion of the shielding electrode 160 so that a horizontal component of the electric field boundary is formed stronger than that of an electric field boundary of the other portion. Thus, as shown in FIG. 6, it is recognized that a direction of liquid crystal molecules on the shielding electrode 160 is close to a horizontal direction.

That is, a second efficiency of liquid crystal molecules is increased in a condition where an electric field is applied, in which the liquid crystal molecules are placed at an edge of the pixel area PA. The second efficiency means a movement efficiency in which the liquid crystal molecules are rotated from a vertical direction to a horizontal direction.

Alternatively, a horizontal component of the electric field boundary may be substantially parallel with a vertical direction at an upper portion of the gate line 111, and may be substantially parallel with a horizontal direction at an upper portion of the data line 115. Also, a director of the liquid crystal molecules may be arranged in parallel with a length direction of the slit portions 173. The slit portions 173 are extended to the horizontal direction or the vertical direction depending on the domain.

That is, a horizontal component direction of the electric field boundary in which the liquid crystal molecules move is substantially the same as a length direction of the slit portion 173, which guides the director of the liquid crystal molecules. Thus, the liquid crystal molecules do not need to rotate in a horizontal direction. Accordingly, a third efficiency of the liquid crystal molecules is increased. The third efficiency means a rotation efficiency of the liquid crystal molecules in the horizontal direction.

Accordingly, the liquid crystal molecules may be effectively controlled at the edge of the pixel area PA so that texture generation is prevented, and the aperture ratio and response time of the liquid crystal molecules may be improved.

Figure 7A:
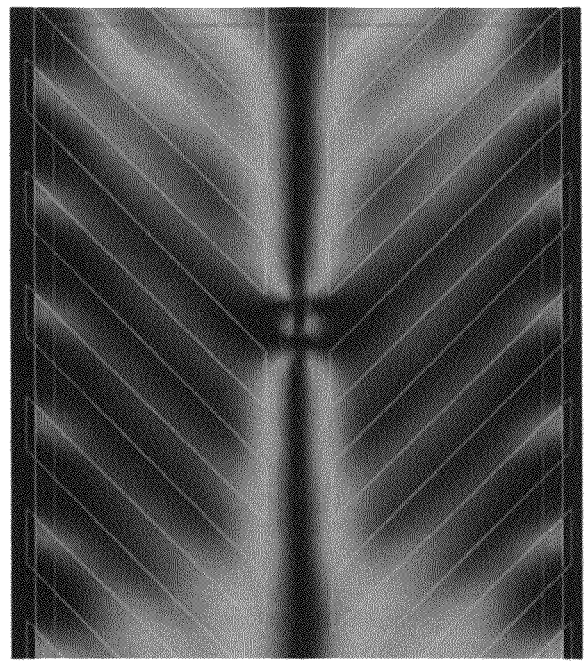
FIG. 7A is an image observing light transmissivity of the LCD device in which slit portions are formed in a diagonal direction.
Figure 7B:
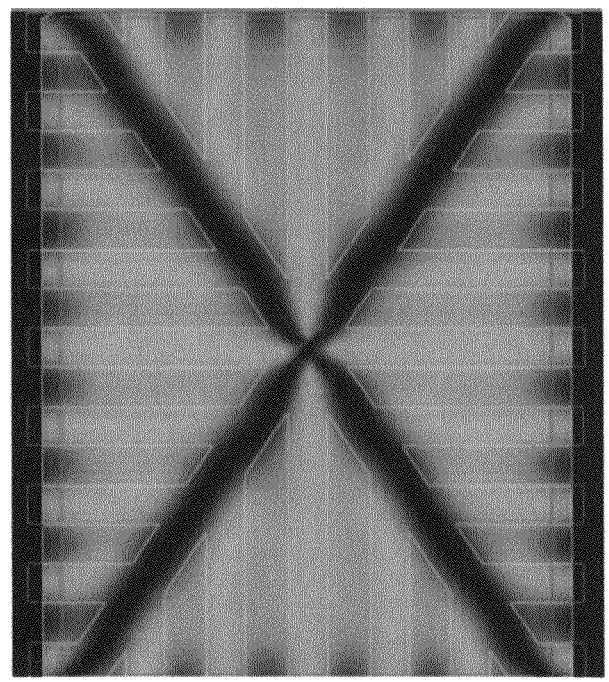
FIG. 7B is an image observing light transmissivity of the LCD device shown as FIG. 1, FIG. 2, FIG. 3, FIG. 4, FIG. 5A, and FIG. 5B.

FIG. 7A is an image showing light transmissivity of the LCD device in which slit portions 173 are formed in diagonal directions. FIG. 7B is an image showing light transmissivity of the LCD device 100 shown as FIG. 1, FIG. 2, FIG. 3, FIG. 4A, FIG. 4B, FIG. 4C, FIG. 4D, FIG. 4E, FIG. 4F, FIG. 4G, FIG. 4H, FIG. 4I, FIG. 5A, and FIG. 5B.

FIG. 7A and FIG. 7B are images showing light transmissivity after an identical time from that when the pixel voltage is applied. A dark portion of the images represents that light transmissivity is lower than other portions due to a slow response of liquid crystal molecules.

As shown in FIG. 7A, the slit portion 173 of the LCD device is extended to one of the diagonal directions unlike in the present exemplary embodiment. In addition, the outline portion 175 connecting to edge portions of the slit portion 173 is removed, a shielding electrode 160 as light-blocking metal is formed on a portion of the pixel area PA unlike in the present exemplary embodiment. The LCD device is substantially identical to the LCD device 100 of the present exemplary embodiment except in the-above mentioned manner.

The image in FIG. 7B is brighter than the image in FIG. 7A, and has a uniform luminance. A portion between an edge of the pixel area PA and the slit portions 173 is relatively darker than the other portion in FIG. 7B.

Figure 8:
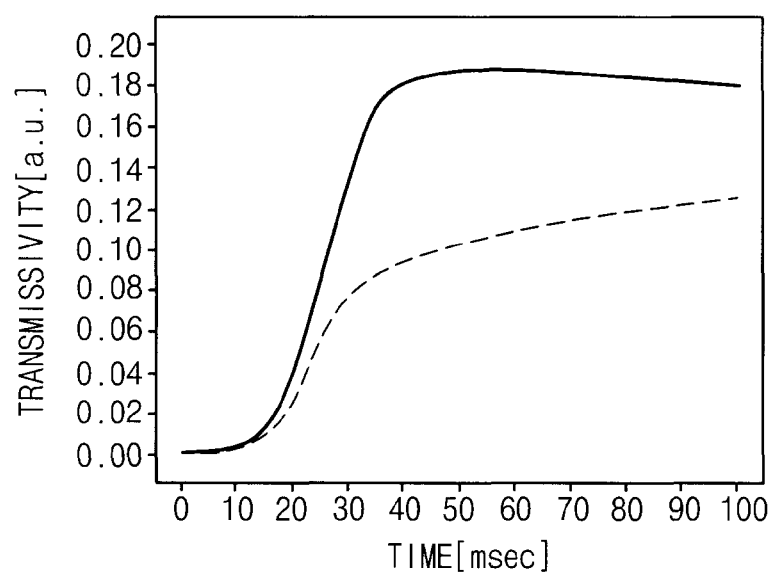
FIG. 8 is a graph representing response time of LCD devices shown as FIG. 7A and FIG. 7B.

FIG. 8 is a graph showing a response time of the LCD device shown as FIG. 7A and FIG. 7B.

A horizontal axis represents an elapsed time after applying a pixel voltage, and a vertical axis represents a light transmissivity of a pixel area PA in FIG. 8. Referring to FIG. 8, it is recognized that a light transmissivity of the LCD device described in FIG. 7A, which is represented by the dashed line, is substantially lower than light transmissivity of the LCD device 100 of the present exemplary embodiment described in FIG. 7B, which is represented by the solid line, for a substantially identical time.

That is, the LCD device described in FIG. 7A and FIG. 8 does not include the light transmissivity improving effect by the outline portion 175 and the shielding electrode 160 unlike the present exemplary embodiment, and a direction of the slit portion 173 and a direction of horizontal electric field is different from each other in an angle of 45 degrees so that the second and third efficiency of the liquid crystal molecules is low.

The second and third efficiency of the liquid crystal molecules in the LCD device 100 of the present exemplary embodiment may be improved by the outline portion 175, the shielding electrode 160, and a direction of the slit portion 173 more than the LCD device described in FIG. 7A and FIG. 8, so that the display quality of the LCD device 100 may be improved.

Figure 9:
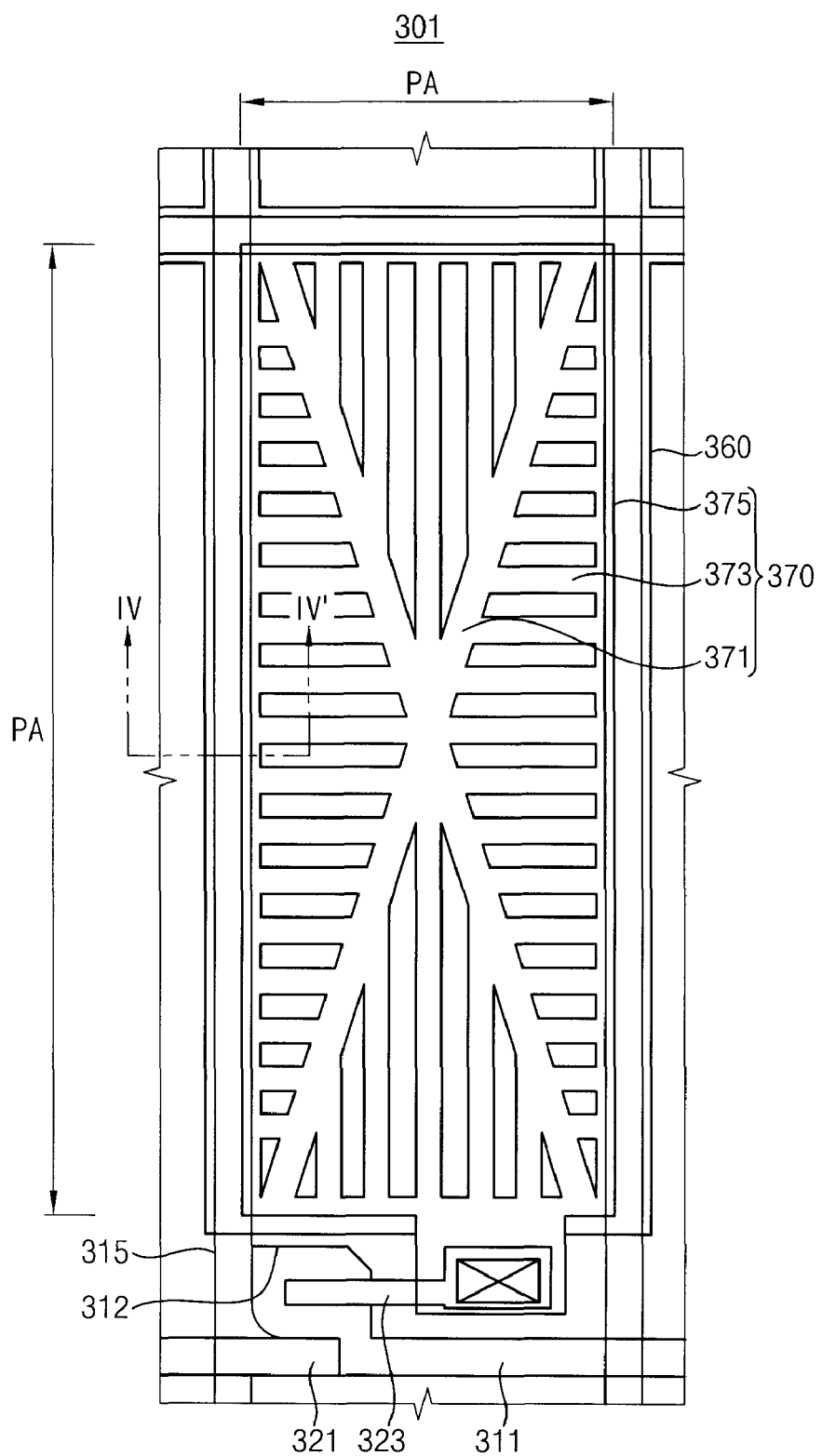
FIG. 9 is an enlarged plan view showing a pixel area of the array substrate of the LCD device according to another exemplary embodiment of the present invention.
Figure 10:
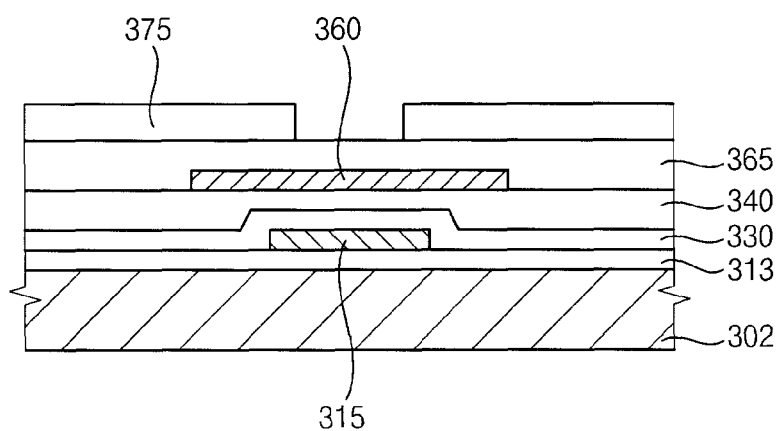
FIG. 10 is a cross-sectional view taken along line IV-IV' in FIG. 9.

FIG. 9 is an enlarged plan view showing a pixel area of the array substrate of the LCD device according to another exemplary embodiment of the present invention. FIG. 10 is a cross-sectional view taken along line IV-IV' in FIG. 9.

Referring to FIG. 9 and FIG. 10, an array substrate and a process for manufacturing the array substrate of this exemplary embodiment is substantially identical to the array substrate and the process for manufacturing the array substrate described in FIG. 1 and FIG. 6, except a size of the pixel electrode 370 and an omitted organic insulation layer 140. Accordingly, the same reference numerals will be used to refer to the same elements as those described, and any detailed explanation will be omitted.

In this exemplary embodiment, wherein the one pixel electrode 370 is disposed in the pixel area PA, and a long side of the pixel electrode 370 is substantially parallel with the direction in which the data line 315 extends. The pixel electrode is substantially identical to the pixel electrode 170 described in FIG. 1, FIG. 2, FIG. 3, FIG. 4A, FIG. 4B, FIG. 4C, FIG. 4D, FIG. 4E, FIG. 4F, FIG. 4G, FIG. 4H, FIG. 4I, FIG. 5A, FIG. 5B, and FIG. 6. Thus, the slit portions 373 of the vertical direction are longer than the slit portions 373 of the horizontal direction.

FIG. 11A, FIG. 11B, FIG. 11C, and FIG. 11D are cross-sectional views showing a process for manufacturing the array substrate shown as FIG. 9 and FIG. 10.

Figure 11A:
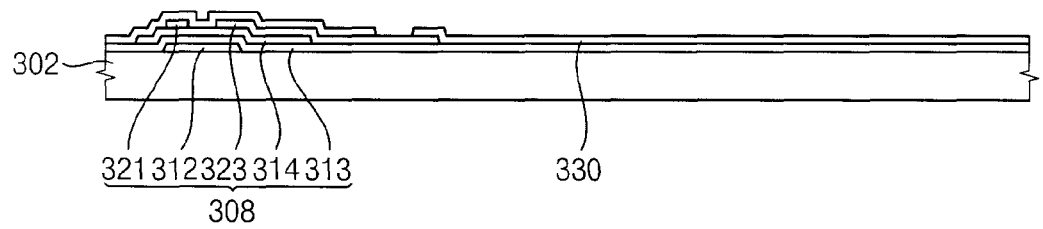
FIG. 11A, FIG. 11B, FIG. 11C, and FIG. 11D are cross-sectional views showing a process for manufacturing the array substrate shown in FIG. 9 and FIG. 10.
Figure 11B:
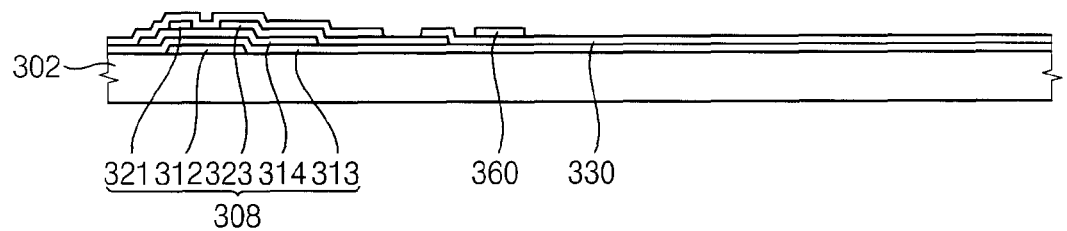
Figure 11C:
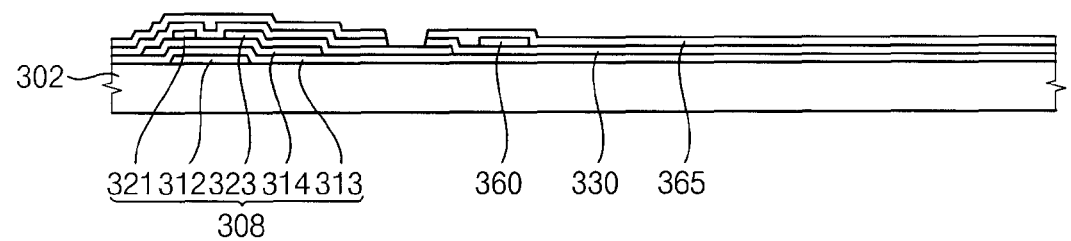
Figure 11D:
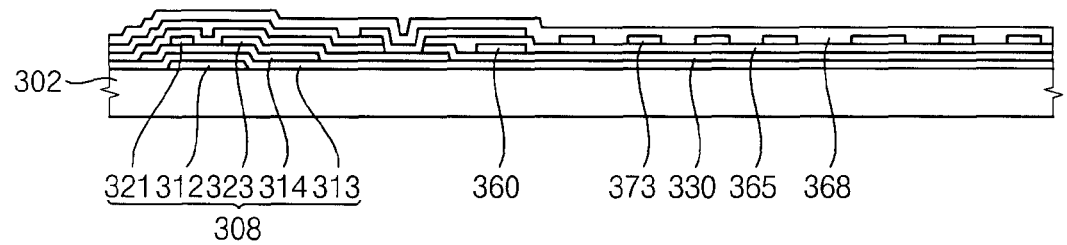

In a process for forming the array substrate according to this exemplary embodiment, the organic insulation layer 140 is omitted, and a first passivation layer 330 is formed as shown in FIG. 11A, and a shielding electrode 360 is formed on the first passivation layer 330 as shown in FIG. 11B. Then, a second passivation layer 365 covering the shielding electrode 360 is formed as shown in FIG. 11C. Then, the pixel electrode 370 is formed on the second passivation layer 365 and an alignment layer 368 is formed as shown in FIG. 11D.

A process for forming an organic insulation layer 140 is omitted to reduce a process step in this exemplary embodiment.

The LCD device in this exemplary embodiment is substantially identical to the LCD device described in FIG. 1, FIG. 2, FIG. 3, FIG. 4A, FIG. 4B, FIG. 4C, FIG. 4D, FIG. 4E, FIG. 4F, FIG. 4G, FIG. 4H, FIG. 4I, FIG. 5A, FIG. 5B, and FIG. 6 except having the array substrate in FIG. 9 and FIG. 10. Accordingly, any detailed explanation will be omitted.

Figure 12A:
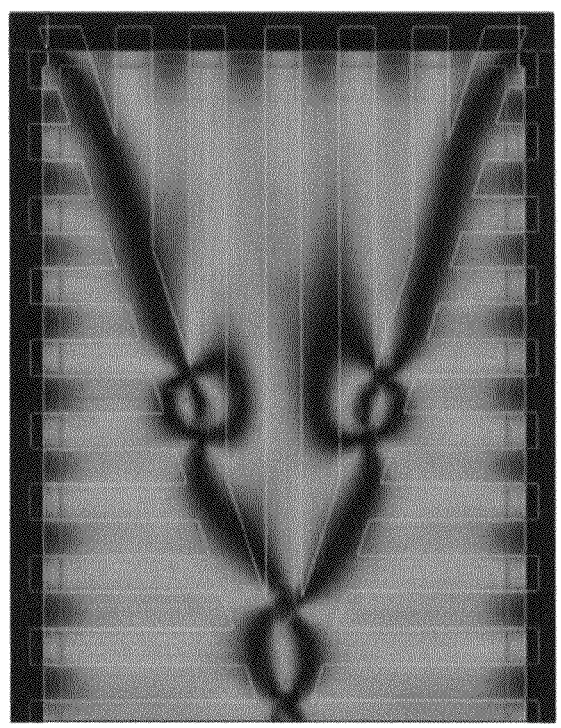
FIG. 12A is an image showing light transmissivity of the LCD device having an array substrate identical to the array substrate shown as FIG. 9 and FIG. 10 except that a pixel electrode does not have an outline portion.
Figure 12B:
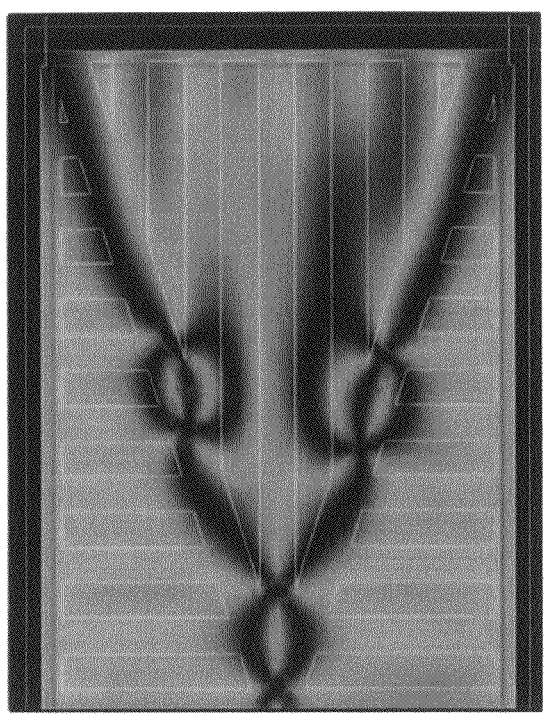
FIG. 12B is an image showing light transmissivity of the LCD device having the array substrate shown in FIG. 9 and FIG. 10.

FIG. 12A is an image showing light transmissivity of the LCD device having an array substrate identical to the array substrate shown as FIG. 9 and FIG. 10, except that a pixel electrode does not have an outline portion. FIG. 12B is an image showing light transmissivity of the LCD device having the array substrate shown as FIG. 9 and FIG. 10.

An outline portion 375 connecting to edge portions of the slit portion 373 is removed, and a shielding electrode 360 as light-blocking metal is formed on a portion of the pixel area PA, unlike in the present exemplary embodiment. The LCD device is substantially identical to the LCD device 100 of the present exemplary embodiment except in the-above mentioned manner. The image in FIG. 12B is brighter than the image in FIG. 12A, and has a uniform luminance. A portion between an edge of the pixel area PA and the slit portions 373 is relatively darker than the other portion in FIG. 12A.

Figure 13:
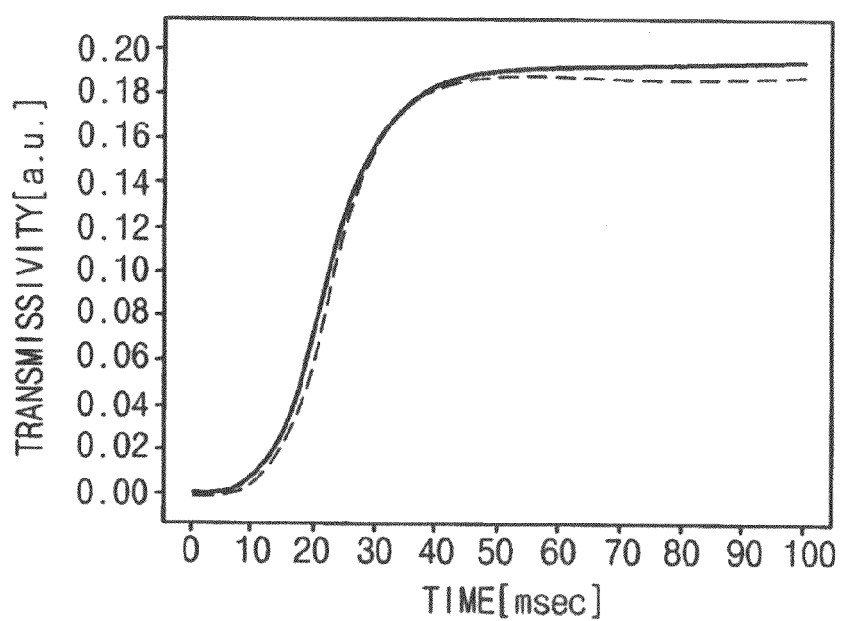
FIG. 13 is a graph showing a response time of the LCD devices shown in FIG. 12A and FIG. 12B.

FIG. 13 is a graph representing response time of LCD devices shown as FIG. 12A and FIG. 12B.

A horizontal axis represents an elapsed time after applying a pixel voltage, and a vertical axis represents a light transmissivity of a pixel area PA in FIG. 13. Referring to FIG. 13, it is recognized that after 40 msec from applying a pixel voltage a light transmissivity of the LCD device described in FIG. 12A, which is represented by the dashed line, is substantially lower than light transmissivity of the LCD device of the present exemplary embodiment described in FIG. 12B, which is represented by the solid line, for a substantially identical time.

That is, the second and third efficiency of the liquid crystal molecules in the LCD device of the present exemplary embodiment is remarkably improved by the outline portion 375 and the shielding electrode 360 over the LCD device described in FIG. 12A, thus the display quality of the LCD device may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate comprising:
    a substrate comprising a gate line and a data line that cross each other and that are insulated from each other, and a switching element connected to the gate line and the data line;
    a pixel electrode comprising:
        an outline portion arranged on the substrate along the data line and the gate line,
        a plurality of connection portions that extend in a crossing direction of the data line and the gate line, and connect to the outline portion, the connection portions dividing a pixel area defined by the outline portion into a plurality of domains, and
        a plurality of slit portions that protrude from side surfaces of the connection portions in each of the domains, the slit portions being connected to the outline portion; and
    a shielding electrode arranged along the outline portion on the data line and the outline portion on the gate line and shielding the data line and the gate line, respectively, wherein the shielding electrode is arranged between the data line and the outline portion.

2. The array substrate of claim 1, further comprising:
    a first insulation layer arranged between the data line and the shielding electrode; and
    a second insulation layer arranged between the shielding electrode and the pixel electrode.

3. The array substrate of claim 2, further comprising:
    an organic insulation layer arranged between the first insulation layer and the shielding electrode.

4. The array substrate of claim 2, wherein the connection portion is extends in diagonal directions on the pixel electrode to have an X-shape, the slit portions are parallel with the gate line at domains that contact the data line, and the slit portions are parallel with the data line at domains that contact the gate line.

5. The array substrate of claim 4, wherein two pixel electrodes are disposed in the data line direction and connect the outline portions thereof with each other in the pixel area.

6. The array substrate of claim 4, wherein a single pixel electrode is disposed in the pixel area, and a long side of the pixel electrode is parallel with an extending direction of the data line.

7. The array substrate of claim 4, wherein the shielding electrode comprises an optically transparent and electrically conductive material, and the width of the shielding electrode is wider than that of the data line to overlap with a portion of the outline portion.

8. The array substrate of claim 7, wherein the portion of the outline portion overlaps with a portion of the data line and the gate line.

9. The array substrate of claim 4, further comprising:
    a polarizer disposed below the substrate, wherein the polarizer has a polarization axis parallel with one of the diagonal directions.

10. A method of manufacturing an array substrate, the method comprising:
    forming a switching element connected to a gate line and a data line on a substrate;
    forming a pixel electrode comprising:
        an outline portion formed on the substrate along the data line and the gate line,
        a plurality of connection portions that extend in a crossing direction of the data line and the gate line and that connect to the outline portion, the connection portions dividing a pixel area defined by the outline portion into a plurality of domains, and
        a plurality of slit portions that protrude from side surfaces of the connection portions in each of the domains, the slit portions being connected to the outline portion; and
    forming a shielding electrode along the outline portion on the data line and the outline portion on the gate line, to shield the data line and the gate line, respectively, the shielding electrode being arranged between the data line and the outline portion.

11. The method of claim 10, further comprising:
    forming a first insulation layer, the first insulation layer being arranged between the data line and the shielding electrode; and
    forming a second insulation layer, the second insulation layer being arranged between the shielding electrode and the pixel electrode.

12. The method of claim 11, further comprising:
forming an organic insulation layer on the first insulation layer before forming the shielding electrode, wherein the shielding electrode is formed on the organic insulation layer.

13. The method of claim 11, wherein the connection portions extend in diagonal directions on the pixel electrode to have an X-shape, the slit portions are parallel with the gate line at domains contacting the data line, and the slit portions are parallel with the data line at domains contacting the gate line.

14. The method of claim 13, wherein two pixel electrodes are disposed in the data line direction and connect the outline portions thereof with each other in the pixel area.

15. The method of claim 13, wherein a single pixel electrode is disposed in the pixel area, and a long side of the pixel electrode is parallel with an extending direction of the data line.

16. The method of claim 13, wherein the shielding electrode comprises an optically transparent and electrically conductive material, and the width of the shielding electrode is wider than that of the data line and overlaps with a portion of the outline portion, and the portion of the outline portion overlaps with the data line and the gate line.

17. A liquid crystal display (LCD) device comprising:
a display substrate comprising an upper substrate and a common electrode;
an array substrate comprising:
a lower substrate comprising a switching element connected to a gate line and a data line arranged on the lower substrate;
a pixel electrode comprising:
an outline portion arranged along the data line and the gate line,
a plurality of connection portions dividing a pixel area defined by the outline portion into a plurality of domains, in which the connection portions extend in a crossing direction of the data line and the gate line, and connect to the outline portion, and
a plurality of slit portions that protrude from side surfaces of the connection portions and connect to the outline portion; and
a shielding electrode arranged between the data line and the outline portion, in which the shielding electrode is arranged along the outline portion on the data line and the outline portion on the gate line and shielding the data line and the gate line, respectively; and
a liquid crystal layer disposed between the pixel electrode and the common electrode.

18. The LCD device of claim 17, wherein the array substrate further comprises:
a first insulation layer arranged between the data line and the shielding electrode; and
a second insulation layer arranged between the shielding electrode and the pixel electrode.

19. The LCD device of claim 18, wherein the array substrate further comprises an organic insulation layer arranged between the first insulation layer and the shielding electrode.

20. The LCD device of claim 18, wherein the connection portion extends in diagonal directions on the pixel electrode and has an X-shape, the slit portions are parallel with the gate line on domains that contact the data line, and the slit portions are parallel with the data line on domains that contact the gate line.

21. The LCD device of claim 20, wherein two pixel electrodes are disposed in the data line direction and that connect the outline portions thereof with each other on one of the pixel areas.

22. The LCD device of claim 20, wherein a single pixel electrode is disposed in the pixel area, and a long side of the pixel electrode is parallel with an extending direction of the data line.

23. The LCD device of claim 20, wherein the shielding electrode comprises an optically transparent and electrically conductive material, and the width of the shielding electrode is wider than that of the data line to overlap with a portion of the outline portion.

24. The LCD device of claim 20, wherein a long axis direction of the liquid crystal molecules is perpendicular to the common electrode when the electric field is an off status.

25. The LCD device of claim 24, further comprising:
a first polarizer disposed below the lower substrate, in which a polarization axis is parallel with one of the diagonal directions; and
a second polarizer disposed on the upper substrate, in which a polarization axis is parallel with another of the diagonal directions.

* * * * *